United States Patent [19]
Tamai et al.

[11] Patent Number: 6,139,470
[45] Date of Patent: Oct. 31, 2000

[54] CONTROL APPARATUS FOR HYDRAULICALLY OPERATED VEHICULAR TRANSMISSION

[75] Inventors: Masaya Tamai; Masaaki Tsuruoka; Yoshihiro Tsuboi; Yasushi Shimizu; Masaru Yamashita; Shunichi Nogami, all of Saitama, Japan

[73] Assignee: Honda Giken Kogyo Kabushiki Kaisha, Tokyo, Japan

[21] Appl. No.: 09/354,733

[22] Filed: Jul. 16, 1999

[30] Foreign Application Priority Data

Jul. 21, 1998 [JP] Japan .................................. 10-205533

[51] Int. Cl.⁷ .................................................. F16H 59/20
[52] U.S. Cl. ........................................... 477/136; 477/141
[58] Field of Search .................................... 477/121, 135, 477/136, 140, 141

[56] References Cited

U.S. PATENT DOCUMENTS

| | | | |
|---|---|---|---|
| 4,282,781 | 8/1981 | Iwanaga et al. ........................ | 477/141 |
| 4,413,536 | 11/1983 | Whitney et al. ..................... | 477/135 X |
| 4,547,178 | 10/1985 | Hayakawa et al. ................... | 477/49 X |
| 4,719,822 | 1/1988 | Morisawa ................................. | 477/130 |
| 6,045,483 | 4/2000 | Tamai et al. ............................ | 477/140 |

FOREIGN PATENT DOCUMENTS

| | | | |
|---|---|---|---|
| 3205198A1 | 9/1983 | Germany .............................. | 477/136 |
| 355047036A | 4/1980 | Japan .................................... | 477/136 |
| 3-223564 | 10/1991 | Japan . | |

*Primary Examiner*—Charles A Marmor
*Assistant Examiner*—Roger Pang
*Attorney, Agent, or Firm*—Armstrong, Westerman, Hattori, McLeland & Naughton

[57] ABSTRACT

A control apparatus for a hydraulically operated vehicular transmission includes a orifice, a bypass path bypassing the orifice and a switching valve provided in the bypass path. The orifice and bypass path are provided in an hydraulic oil supplying path to a hydraulic pressure coupling element provided in said hydraulically operated vehicular transmission. The switching valve shuts off said bypass path in association with the throttle of an engine at a low opening time when a throttle opening degree is equal to or lower than a first predetermined value and at a high opening time when the throttle opening degree is equal to or higher than a second predetermined value which is higher than the first predetermined value.

3 Claims, 6 Drawing Sheets

CONTROL APPARATUS FOR HYDRAULICALLY OPERATED VEHICULAR TRANSMISSION

BACKGROUND OF THE INVENTION

1. Field of the Invention

This invention relates to a control apparatus for a hydraulically operated vehicular transmission which is mounted on automobiles and other vehicles.

2. Description of the Related Art

A hydraulically operated vehicular transmission has a plurality of hydraulic pressure coupling elements. Those hydraulic pressure coupling elements are connected to hydraulic oil supplying paths which are connected through a shift valve to a hydraulic pressure source, so that by supplying hydraulic oil to the hydraulic pressure coupling elements, a desired gear change stage is selectively obtained.

In a control apparatus for a transmission of this type, recently, there is generally used an electronic control type control apparatus. This control apparatus is provided with electromagnetic proportional valves which control the hydraulic pressures in the hydraulic oil supplying paths to the hydraulic pressure coupling elements, and a controller for controlling the electromagnetic proportional valves electronically controls the pressure rise characteristics of the hydraulic pressure coupling elements at the time of speed change, to thereby absorb the speed change shock. On the other hand, because of the manufacturing cost, a control device of non-electronic control type is also employed.

A related control device of the non-electronic control type is designed as follows. That is, an oil supplying path to a predetermined hydraulic pressure coupling element, for instance, a second-speed hydraulic pressure coupling element, of a transmission is provided with an orifice and a bypass path bypassing the orifice, and in the bypass path, a switching (open and close) valve is provided which shuts off the bypass path when the throttle opening degree is small (cf. for instance Japanese Patent Application (OPI) No. 223564/1991 (the term "OPI" as used herein means an "unexamined published application")).

If, when a down-shift operation to the second speed gear by deceleration (i.e, acceleration return) is conducted, the second speed hydraulic pressure coupling element is abruptly coupled, then the second speed gear is established before the speed of the engine is sufficiently increased. And the drive torque on the output side of the transmission is decreased; that is, so-called "acceleration return shock" occurs. However, with the above-described related control device, at the time of the down shift, the bypass path is shut off, so that the hydraulic oil is supplied through the orifice to the second speed hydraulic pressure coupling element. Therefore, the latter is gradually coupled; that is, the acceleration return shock is softened.

If, when the down shift to the second speed gear is conducted by the kick down which occurs when the acceleration pedal is stepped on, the second speed hydraulic pressure coupling element is abruptly coupled, then a problem occurs; that is, the drive torque on the output side of the transmission is abruptly increased; that is, so-called "kick down shock" occurs. The above-described related control device cannot deal with this problem when the throttle opening degree is high; that is, with the related control device, it is impossible to obtain a high operational performance over the whole range of throttle opening degrees.

SUMMARY OF THE INVENTION

In view of the foregoing, an object of the invention is to provide a control device of non-electronic control type which provides a high operational performance over the whole range of throttle opening degrees.

In order to solve the above-described problem, in a control apparatus for a hydraulically operated vehicular transmission, according to the invention, an orifice, and a bypass path for bypassing the orifice are provided in an oil supplying path to a hydraulic pressure coupling element provided in the hydraulically operated vehicular transmission, and, in the bypass path, a switching valve is provided which shuts off the bypass path in association with the throttle of an engine at a low opening time when a throttle opening degree is equal to or lower than a first predetermined value and at a high opening time when the throttle opening degree is equal to or higher than a second predetermined value which is higher than the first predetermined value. The first predetermined value is set to the throttle opening degree with which when, with the engine output being low, the speed is changed, the drive torque on the output side of the transmission is liable to decrease. The second predetermined value is set to the throttle opening degree with which when, with the engine output being high, the speed is changed, the drive torque is liable to abruptly increase.

According to the invention, when the throttle opening degree is high, hydraulic oil is supplied through the orifice to the hydraulic pressure coupling element. Therefore, since the hydraulic pressure coupling element is connected in sequence, the drive torque on the output side of the transmission is gently increased, and the kick down shock is eased. In the case, too, where the throttle opening degree is low, hydraulic oil is supplied through the orifice to the hydraulic pressure coupling element, and the acceleration pedal return shock is eased.

The amount of restriction suitable for easing the kick down shock, and the amount of restriction suitable for easing the acceleration pedal return shock are not always equal to each other. Hence, first and second orifices, which are in series with each other, are provided in place of the aforementioned orifice, and a first bypass path for bypassing the first orifice and a second bypass path for bypassing the second orifice are provided in place of the aforementioned bypass path, and a first switching valve for communicating with and shutting off the first bypass path and a second switching valve for communicating with and shutting off the second bypass path are provided in place of the aforementioned switching valve. When the throttle opening degree is low, only the first bypass path is shut off with the first switching valve; and when the throttle opening degree is high, only the second bypass path is shut off with the second switching valve. In this case, the orifice which acts in supplying hydraulic oil to the hydraulic pressure coupling element is a first orifice when the throttle opening degree is low; and it is a second orifice when it is high in opening degree. Hence, the first orifice is made suitable in the amount of restriction for easing the acceleration pedal return shock, and the second orifice is made suitable in the amount of restriction for easing the kick down shock; that is, with respect to the acceleration pedal return shock and the kick down shock, control is most suitably performed. If, in this case, the first and second switching valves are provided as a common movable member which operates in association with the throttle of the engine, then the number of components and accordingly the manufacturing cost are decreased as much.

DETAILED DESCRIPTION OF THE PREFERRED EMBODIMENT

Figure 1:
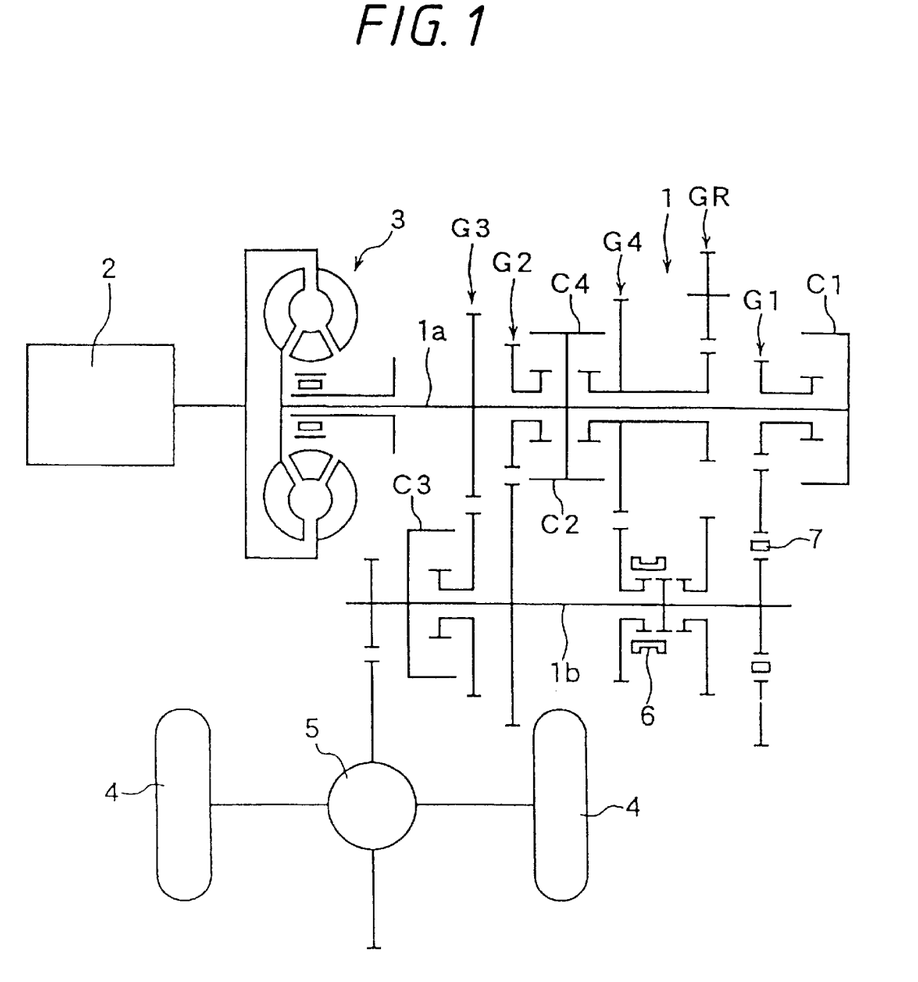
FIG. 1 is a skeleton diagram showing an example of a transmission to which a control device of the invention is applied.

In FIG. 1, reference numeral 1 designates a transmission which performs speed changes—four advance gears and one reverse gear. The transmission 1 has first through fourth advance gear stages G1, G2, G3 and G4 and a reverse gear GR between an input shaft 1a which is coupled through a torque converter 3 to an engine 2 and an output shaft 1b which is coupled through a differential gear 5 to the drive wheels 4 of the vehicle. And hydraulic pressure coupling elements, namely, hydraulic clutches C1, C2, C3 and C4 of first, second, third and fourth speeds are provided for the advance gear change stages G1, G2, G3 and G4, respectively.

The reverse gear change stage GR shares the fourth gear change stage G4 with the fourth speed hydraulic clutch C4, and the fourth gear change stage G4 and the reverse gear change stage GR are selectively established by means of a selector 6 arranged on the out put shaft 1b. The first gear change stage G1 is provided with a one-way clutch 7 which allows the output shaft 1b to overrun.

Figure 2:
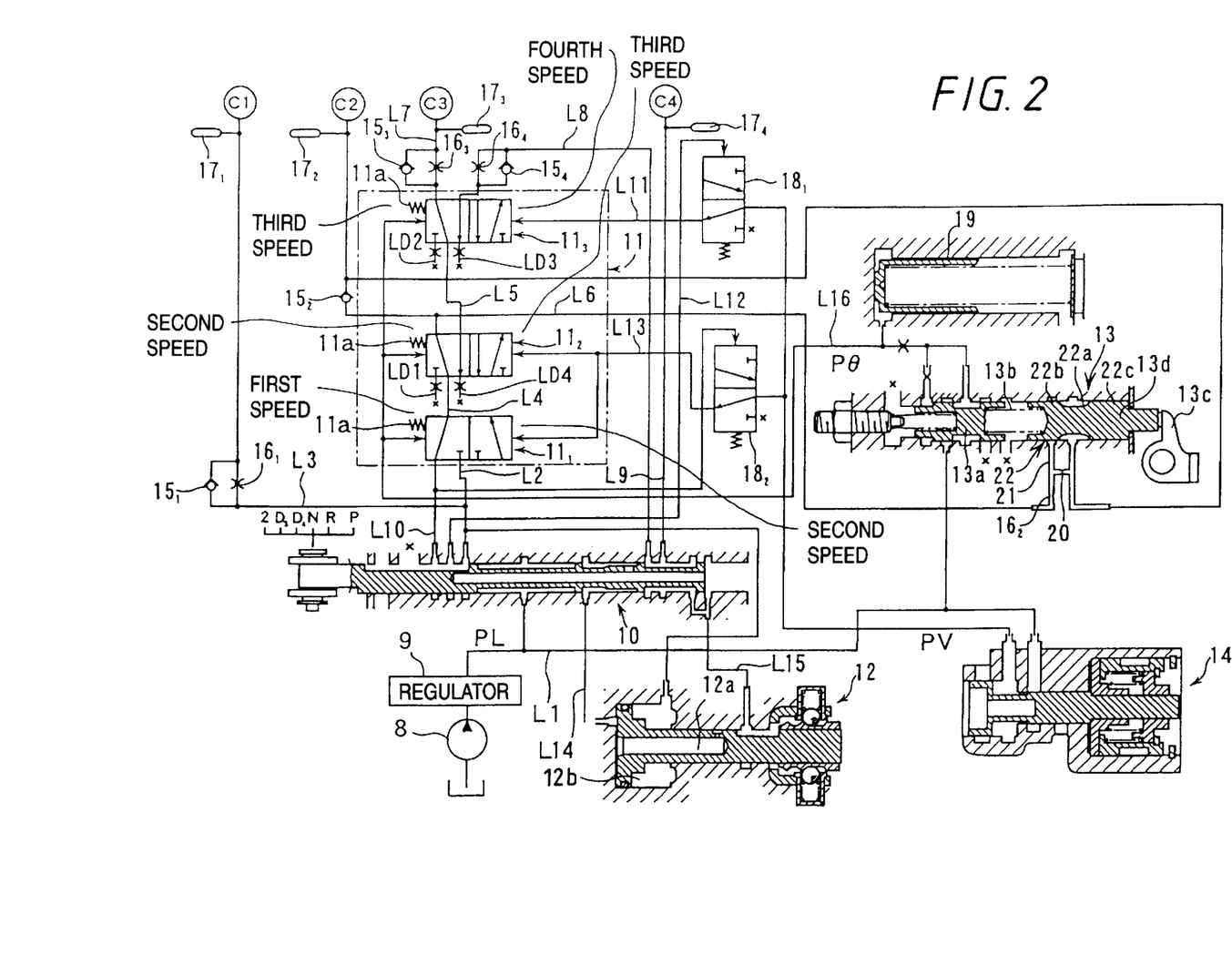
FIG. 2 is a hydraulic pressure circuit diagram showing an example of the control device according to the invention.

The supplying and discharging of hydraulic oil for the hydraulic clutches C1, C2, C3 and C4 are controlled by a hydraulic pressure circuit shown in FIG. 2. The hydraulic pressure circuit includes a hydraulic pressure source 8, a regulator 9, a manual valve 10, a shift valve unit 11, and a servo valve 12 for switching advance and reverse movements which couples to the above-described selector 6.

The manual valve 10 may be changed over to six positions of "P" for parking, "R" for the reverse operation, "N" for the neutral, "$D_4$" for automatic speed change of the first through fourth speeds, "$D_3$" for automatic speed change of the first through fourth speed, and "2" for holding the second speed. At the "$D_4$" position, a first hydraulic oil path L1 adapted to supply hydraulic oil from the hydraulic pressure source 8 whose hydraulic pressure is adjusted to a predetermined line pressure PL by the regulator 9, is connected to a second hydraulic oil path L2 which is coupled to a shift valve unit 11. Hydraulic oil is supplied selectively to the second, third and fourth hydraulic clutches C2, C3 and C4 through the shift valve unit 11, and hydraulic oil is always supplied to the first speed hydraulic clutch C1 through a third hydraulic oil path L3 which branches from the second hydraulic oil path L2.

The shift valve unit 11 includes: a 1–2 shift valve $11_1$ on the upstream side; a 2–3 intermediate shift valve $11_2$ which is connected through a fourth hydraulic oil path L4 to the 1–2 shift valve $11_1$; and a 3–4 shift valve $11_3$ on the downstream side which is connected through a fifth hydraulic oil path L5 to the 2–3 intermediate shift valve $11_2$. And in order to control so as to change over those shift valves $11_1$, $11_2$ and $11_3$ according to the throttle opening degree and the vehicle speed, there is provided a throttle valve 13 which is a throttle hydraulic pressure signal outputting means for outputting a throttle hydraulic pressure signal (hereinafter referred to as "a throttle pressure Pθ", when applicable) according to the throttle opening degree and also there is a governor valve 14 which is a vehicle speed hydraulic pressure signal outputting means for outputting a vehicle speed hydraulic pressure signal (hereinafter referred to as "a governor pressure PV", when applicable) according to the vehicle speed. The shift valves $11_1$, $11_2$ and $11_3$ are pushed to the low speed positions by means of the throttle pressure Pθ and energizing means 11a, and to high speed positions by the governor pressure PV.

At the time of the start at the "D4" position, hydraulic oil is supplied to the first speed hydraulic clutch C1 to establish the first gear change stage G1. Thereafter, the vehicle speed is increased, the 1–2 shift valve $11_1$, is changed over from the low speed position, namely, the first speed position to the high speed position, namely, the second speed position by the governor pressure PV, so that the second hydraulic oil path L2 is connected to the fourth hydraulic oil path L4. Therefore, hydraulic oil is supplied to the second speed hydraulic clutch C2 through the sixth hydraulic oil path L6 on the discharging side of the 2–3 shift valve $11_2$. Thus, the gear is shifted up from the first speed to the second speed. When the vehicle speed is further increased, the 2–3 shift valve $11_2$ is changed over from the low speed position, namely, the second speed position to the high speed position, namely, the third speed position, and the fourth hydraulic oil path L4 is connected to the fifth hydraulic oil path L5. Therefore, hydraulic oil is supplied to the third speed hydraulic clutch C3 through the seventh hydraulic oil path L7 on the discharging side of the third shift valve $11_3$, and the sixth hydraulic oil path L6 is connected through the 2–3 shift valve $11_2$ to a first hydraulic oil discharge path LD1. And, hydraulic oil is discharged from the second speed hydraulic clutch C2. Thus, the gear is shifted up from the second speed to the third speed. When the vehicle speed is further increased, the 3–4 shift valve $11_3$ is changed over from the low speed position, namely, the third speed position to the high speed position, namely, the fourth speed position, and the fifth hydraulic oil path L5 is connected to the eighth hydraulic oil path L8. Therefore, hydraulic oil is supplied to the fourth speed hydraulic clutch C4 through the ninth hydraulic oil path L9 which is connected to the eighth hydraulic oil path L8 at the "$D_4$" position. At the same time, the seventh hydraulic oil path L7 is connected through the 3–4 shift valve $11_3$ to the second hydraulic oil discharge path LD2, so that hydraulic oil is discharged from the third speed hydraulic clutch C4, and the gear is shifted up from the third speed to the fourth speed.

When the vehicle speed is decreased (at the time of deceleration) the 3–4 shift valve $11_3$ is returned to the third speed position, and hydraulic oil is supplied to the third speed hydraulic clutch C3 through the same path as that described above. At the same time, the eighth hydraulic oil path L8 is connected through the 3–4 shift valve $11_3$ to the hydraulic oil discharge path LD3, so that hydraulic oil is discharged from the fourth speed hydraulic clutch C4 and the gear is shifted down from the fourth speed to the third speed. When the vehicle speed is further decreased, the 2–3 shift valve $11_2$ is returned to the second speed position, and hydraulic oil is supplied to the second speed hydraulic clutch C2 through the same path as that described above. At the same time, the fifth hydraulic oil path L5 is connected through 2–3 shift valve $11_2$ to the fourth hydraulic oil discharge path LD4, so that hydraulic oil is discharged from the third speed hydraulic clutch C3 and the gear is shifted down from the third speed to the second speed. When the vehicle speed is further decreased, the 1–2 shift valve $11_1$ is returned to the first speed position, and the fourth hydraulic oil path L4 is connected through 1–2 shift valve $11_1$ to the tenth hydraulic oil path L10 which is opened to the air at the "$D_4$" position. Therefore, hydraulic oil is discharged from the second speed hydraulic clutch C2 and the gear is shifted down from the second speed to the first speed.

Figure 3:
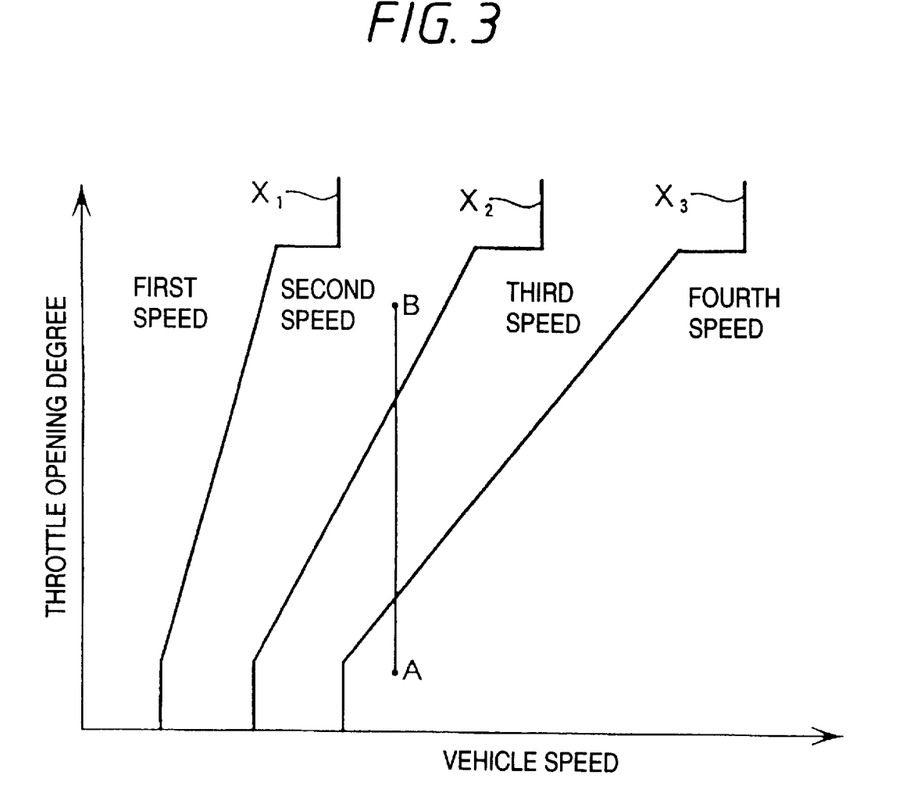
FIG. 3 is a graphical representation indicating speed change characteristics.

Thus, in a speed change characteristic as shown in FIG. 3, the speed is automatically changed between the first speed and the fourth speed is effected. In FIG. 3, reference characters $X_1$, $X_2$, and $X_3$ designate the first speed–second speed, the second speed–third speed, and the third speed–fourth speed speed-change characteristic lines, respectively. In the third hydraulic oil path L3, the sixth hydraulic oil path L6, the seventh hydraulic oil path L7, and the eighth hydraulic oil path L8 which are the hydraulic oil supply paths to the hydraulic clutches C1, C2, C3 and C4 for the first, second, third and fourth speeds, there are intervened hydraulic oil discharging check valves $15_1$, $15_2$, $15_3$ and $15_4$ and hydraulic oil supplying orifices $16_1$, $16_2$, $16_3$ and $16_4$ connected in parallel to the aforementioned hydraulic oil discharging check valves. In addition, there are connected accumulators $17_1$, $17_2$, $17_3$ and $17_4$ which absorb the abrupt hydraulic pressure changes of the hydraulic clutches C1, C2, C3 and C4, respectively.

In an eleventh hydraulic oil path L11 for inputting the governor pressure PV from the governor valve 14 to the 3–4 shift valve $11_3$, there is provided a first cut off valve $18_1$ which is closed by the hydraulic pressure of a twelfth hydraulic oil path L12 which is connected to the first hydraulic oil path L1 at the "$D_3$" position. Hence, at the "$D_3$" position, the inputting of the governor pressure to the 3–4 shift valve $11_3$ is suspended, and the 3–4 shift valve $11_3$ is held at the third speed position, so that the automatic speed change of from the first speed to the third speed is effected.

In a thirteenth hydraulic oil path L13 for inputting the governor pressure PV to the 1–2 shift valve $11_1$ and the 2–3 shift valve $11_2$, there is provided a second cut off valve $18_2$ which is closed by the hydraulic pressure from the tenth hydraulic oil path L10. Hence, at the "2" position, the inputting of the governor pressure to the 1–2 shift valve $11_1$ and the 2–3 shift valve $11_2$ is suspended, and the 1–2 shift valve $11_1$ is held at the first speed position while the 2–3 shift valve $11_2$ is held at the second valve position, so that hydraulic oil is supplied from the tenth hydraulic oil path L10 through the fourth hydraulic oil path L4 and the sixth hydraulic oil path L6 to the second speed hydraulic clutch C2 and the gear is held in the second speed.

At the "R" position, a fourteenth hydraulic oil path L14 provided on the input side of the servo valve 12 is connected to the first hydraulic oil path L1, and a ninth hydraulic oil path L9 connected to the fourth speed hydraulic clutch C4 is connected to a fifteenth hydraulic oil path L15 provided on the output side of the servo valve 12. And, by the hydraulic pressure from the fourteenth hydraulic oil path L14, the servo valve 12 is switched over to the reverse movement position (on the right of the drawing), and the reverse gear change stage GR is coupled through the selector 6 to the output shaft $1b$. And, at the reverse movement position the fourteenth hydraulic oil path L14 is connected through an hydraulic oil hole $12a$ (formed in the servo valve 12) to the fifteenth hydraulic oil path L15, so that hydraulic oil is supplied to the fourth speed hydraulic clutch C4 and the reverse gear change stage GR is established.

At the "$D_4$", "$D_3$" or "2" position, hydraulic pressure from the second hydraulic oil path L2 is applied to the back pressure chamber $12b$ of the servo valve 12, so that the servo valve 12 is switched over to the advance movement position (as shown in the drawing), and the fourth gear change stage G4 is coupled through the selector 6 to the output shaft $1b$.

If, during the fourth speed traveling with the point A in FIG. 3 at the "$D_4$" position, the throttle opening degree is abruptly increased so that the shift is made from the point A to the point B, then substantially at the same time when the 3–4 shift valve $11_3$ is switched to the third speed position, the 2–3 shift valve $11_2$ is switched over to the second speed position. Thus, the gear is shifted down from the fourth speed to the second speed neglecting the third speed may be effected, that is, skipping the third speed. Further, during the second speed traveling with the point B, if the throttle opening degree is abruptly decreased, and the point B is shifted to the point A, then substantially at the same time when the 2–3 shift valve $11_2$ is switched over to the third speed position, the 3–4 shift valve $11_3$ is switched over to the fourth position. Thus, the gear is shifted up from the second speed to the fourth speed neglecting the third speed may be effected, that is, skipping the third speed. And if the above-described speed change skipping operation is carried out, a great shock may occur.

Figure 4:
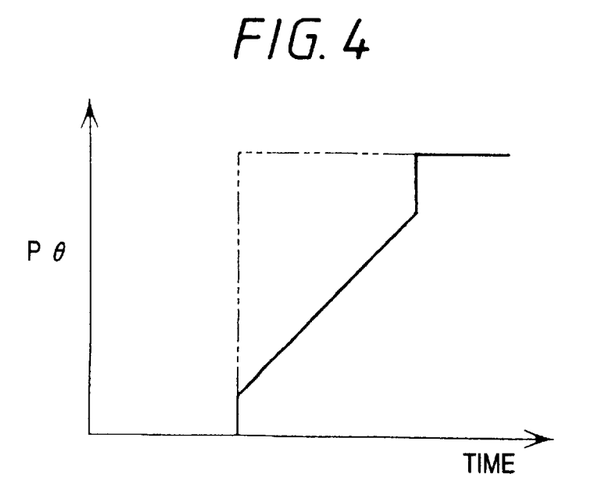
FIG. 4 is a graphical representation showing variations in throttle pressure indicated when the throttle opening degree is abruptly increased.
Figure 5:
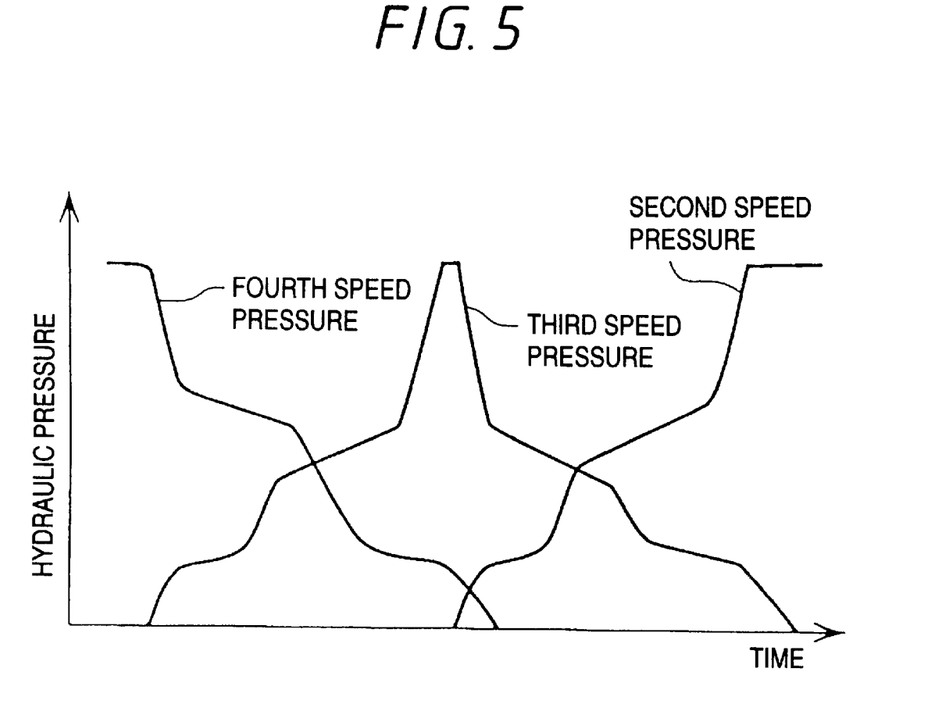
FIG. 5 is a graphical representation indicating hydraulic pressure variations in hydraulic clutches at the 4–2 down shift time.

Hence, in the embodiment, the accumulator 19 is connected to the sixteenth hydraulic oil path L16 adapted to input the throttle pressure Pθ to the shift valves $11_1$, $11_2$ and $11_3$, so that the abrupt change of the throttle pressure Pθ which is due to the abrupt change of the throttle opening degree can be eased. According to this structure, even if the shift is made from the point A to the point B shown in FIG. 3 because of the abrupt increase of the throttle opening degree, and the output hydraulic pressure of the throttle valve 13 is abruptly increased as indicated by the phantom line in FIG. 4, the throttle pressure Pθ applied through the sixteenth hydraulic oil path L16 to the shift valves $11_1$, $11_2$ and $11_3$ is moderately increased as indicated by the solid line in FIG. 4 because of the pressure storing action of the accumulator 19, so that, with a time lag after the third shift valve $11_3$ is switched over to the third speed position, the second shift valve $11_2$ is switched over to the second speed position. And, during this time lag, as shown in FIG. 5 the decrease of the hydraulic pressure of the fourth speed hydraulic clutch C4 (the fourth speed pressure) and the increase of the hydraulic pressure of the third speed hydraulic clutch C3 (the third speed pressure) which are due to the switching of the third shift valve $11_3$ to the third speed position are effected, so that the gear is shifted down to the third speed. Thereafter, the fall of the third speed pressure and the rise of the hydraulic pressure of the second speed hydraulic clutch C2 (the second speed pressure) which are due to the switching of the second shift valve $11_2$ to the second speed position are effected, so that the gear is shifted down to the second speed. Thus, the skipping down shift from the fourth speed directly to the second speed is prevented. When the shift is made from the point B to the point A shown in FIG. 3, the throttle pressure Pθ applied to the shift valves $11_1$, $11_2$ and $11_3$ is moderately decreased as the hydraulic oil is pushed out of the accumulator 19. Therefore, with a time lag after the second shift valve $11_2$ is switched over to the third speed position, the third shift valve $11_3$ is switched over to the fourth speed position. Thus, similarly as in the above-described case, the skipping up shift from the second speed directly to the fourth speed is prevented. At the time of the kick-down from the third speed to the second speed, a time lag occurs to an extent; however, this time lag effectively functions for the speed change after the output of the engine is stabilized; that is, the speed change shock is eased.

The speed change between the first gear change stage G1 provided with the one-way clutch 7 and other gear change stages is smoothly achieved owning to the action of the one-way clutch 7. However, when, to the gear change stage not employing the one-way clutch, the down shift is effected by decreasing the speed when the acceleration pedal is returned, or by the kick down when the acceleration pedal is stepped on, the shock is liable to occur. This tendency is significant with the second speed gear which is the lowest gear change stage employing no one-way clutch. That is, if, when the down shift is effected by decreasing the speed when the acceleration pedal is returned, the second speed hydraulic oil clutch C2 is abruptly coupled, the second speed gear is established before the speed of the engine is sufficiently increased, so that the drive torque of the drive wheels 4 is decreased, and a so-called "acceleration pedal return shock" occurs. Furthermore, if, in the case where the down shift to the second speed is effected by the kick down, the second speed hydraulic clutch C2 is abruptly coupled, then the drive torque is quickly increased, and a so-called "kick down shock" occurs.

Therefore, in the embodiment, in the sixth hydraulic oil path L6 which is the hydraulic oil supplying path to the second speed hydraulic clutch C2, a sub-orifice 20 is interposed on the downstream side of a main-orifice $16_2$ which operates at all times, and a bypass path 21 for bypassing the orifice 20 is provided. In addition, an opening and closing valve (switching valve) 22 is provided to communicate with and shut off the bypass path 21. The switching valve 22 shuts off the bypass path 21 at the time of a low opening degree in which the throttle opening degree is lower than a first predetermined value (for instance "⅛ opening degree") with which the acceleration pedal return shock is liable to occur, and at the time of a high opening degree in which the throttle opening degree is higher than a second predetermined value (for instance "⅞ opening degree") with which the kick down shock is liable to occur, and thus, the sub-orifice 20 is operated.

The switching valve 22 is formed integral with a throttle plunger 13d which is a movable member which changes the energizing force of a spring 13b according to the movement of a throttle lever 13c operating in association with the throttle. The spring 13b pushes the spool 13a of the throttle valve 13 towards the open side (to the left in FIG. 2). That is, the throttle plunger 13d is provided with an annular groove 22a which opens the bypass path 21 when the throttle opening degree is a middle value between the first predetermined value and the second predetermined value. And, at the time of the low opening degree, the bypass path 21 is shut off with a land 22b on one side (the left side in FIG. 2) to the annular groove 22a. Further, at the time of the high opening degree, the bypass path 21 is shut off with the land 22c on the other side (the right side in FIG. 2) to the annular groove 22a.

Hence, when the gear is shifted down to the second speed by the deceleration due to the acceleration pedal returning operation, and when the gear is shifted down to the second speed is effected by the kick down, in addition to the main orifice $16_2$, the sub-orifice 20 acts. As a result, the hydraulic pressure of the second speed hydraulic clutch C2 is increased more moderately than in the normal case, so that the second speed hydraulic clutch C2 is gradually coupled; that is, the acceleration pedal return shock, and the kick down shock are eased.

Figure 6:
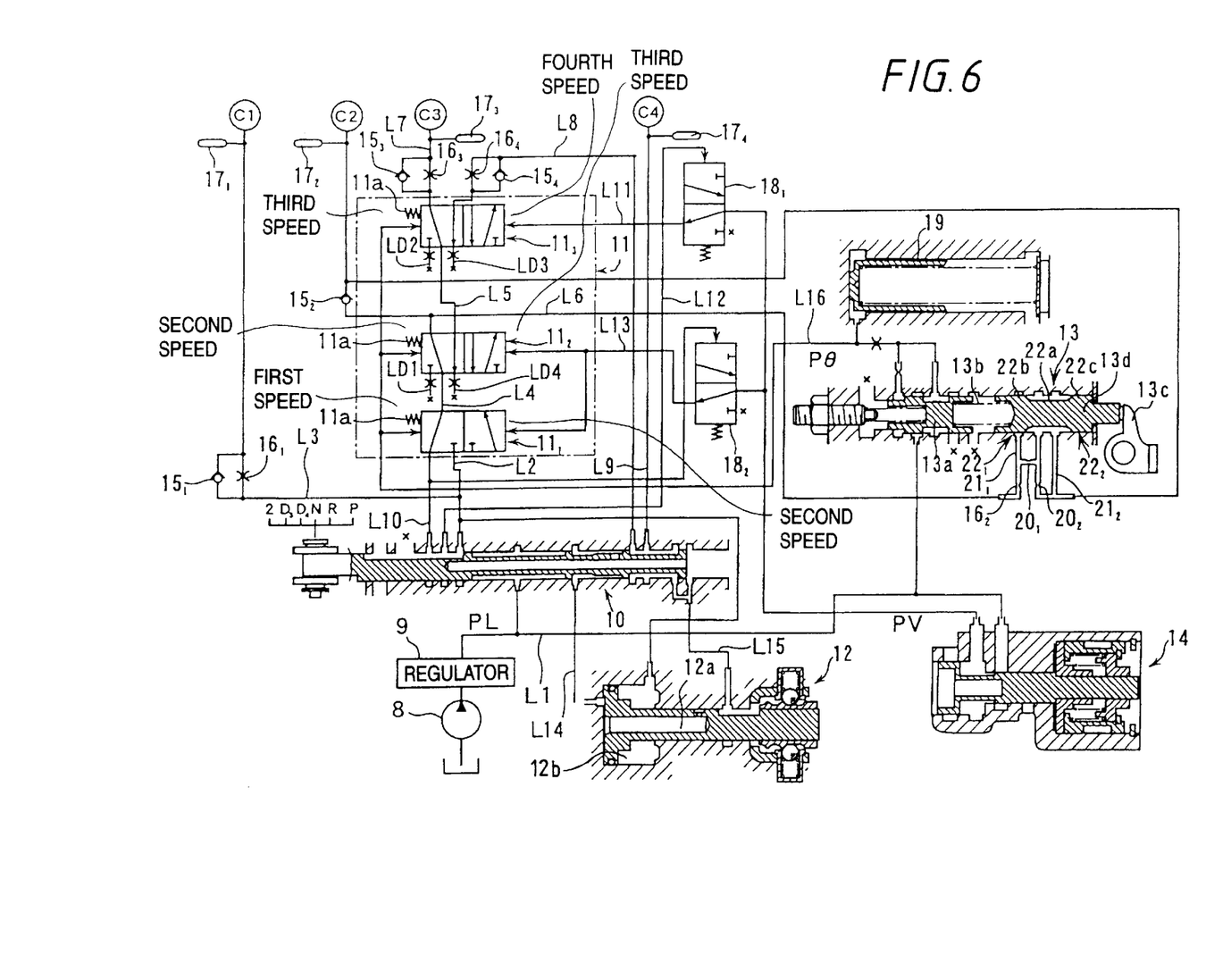
FIG. 6 is a hydraulic pressure circuit diagram showing a modification of the control device of the invention; and, FIG. 7 is a graphical representation indicating the relationship between throttle opening degrees and amounts of restriction.

Sometimes, the amount of restriction suitable for easing the acceleration pedal return shock, and the amount of restriction suitable for easing the kick down shock are not equal to each other. Hence, it is preferable that the embodiment is modified as shown in FIG. 6. That is, in the sixth hydraulic oil path L6, sub-orifices, namely, first and second orifices $20_1$ and $20_2$ are interposed in series on the downstream side of the main orifice $16_2$, and further there are provided a first bypass path $21_1$ for bypassing the first orifice $20_1$ and a second bypass path $21_2$ for bypassing the second orifice $20_2$. Additionally, there are provided a first switching valve $22_1$ for communicating with and shutting off the first bypass path $21_1$ and a second switching valve $22_2$ for communicating with and shutting off the second bypass path $21_2$, so that at the low opening time only the first bypass path $21_1$ is shut off with the first switching valve $22_1$, and at the high opening time only the second bypass path $21_2$ is shut off with the second switching valve $22_2$.

Figure 7:
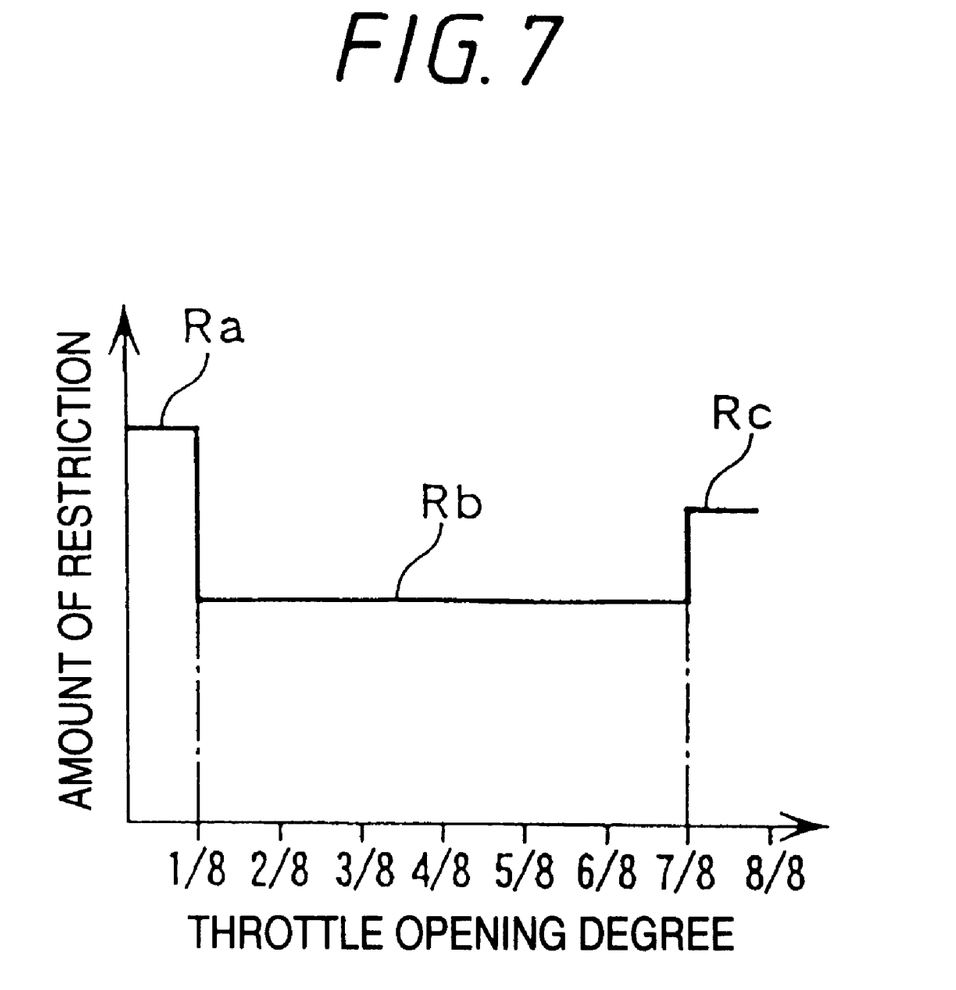

With the above-described modification, the whole amount of restriction (pipe-path resistance) of the sixth hydraulic oil path L6 becomes an amount of restriction Ra due to the actions of the main orifice $16_2$ and the first orifice $20_1$ at the low opening time, an amount of restriction Rb due to the action of the main orifice $16_2$ only at the middle opening degree, and an amount of restriction Rc due to the actions of the main orifice $16_2$ and the second orifice $20_2$ R at the high opening degree. That is, the amount of restriction of the first orifice $20_1$ is set to a value suitable for easing the acceleration pedal return shock, and the amount of restriction of the second orifice $20_2$ is set to a value suitable for easing the kick down shock. Accordingly, the most suitable control for the acceleration pedal return shock and the kick down shock are achieved.

In the hydraulic pressure circuit shown in FIG. 6, the first switching valve $22_1$ and the second switching valve $22_2$ are formed integral with the throttle plunger 13d of the throttle valve 13, so that the hydraulic pressure circuit is simplified in structure as much. In other words, in the throttle plunger 13d, there is formed the annular groove 22a which opens the first and second bypass paths $21_1$ and $21_2$ when the throttle opening degree is middle opening degree. And the first switching valve $22_1$ is formed so as to shut off the first bypass path $21_1$ with one land 22b to the annular groove $22_a$ at the low opening degree, and second switching valve $22_2$ is formed so as to shut off the second bypass path $21_2$ with the other land 22c at the high opening degree.

The embodiment in which the technical concept of the invention is applied to the control apparatus for the biaxial parallel transmission has been described; however, it goes without saying that the technical concept of the invention is applicable to a control apparatus for a planet gear type transmission.

As is apparent from the above description, according to the invention, when the throttle opening degree is high, the orifice acts so that the hydraulic pressure coupling element is gradually coupled, whereby the kick down shock is eased. Furthermore, when the throttle opening degree is low, too, the orifice is operated to ease the acceleration pedal return shock. Thus, an excellent operating performance can be obtained over the whole range of throttle opening degrees.

The present disclosure relates to the subject matter contained in Japanese patent application No. Hei. 10-205533 filed on Jul. 21, 1998 which is expressly incorporated herein by reference in its entirety.

While only certain embodiments of the invention have been specifically described herein, it will apparent that numerous modifications may be thereto without departing from the spirit and scope of the invention.

What is claimed is:

1. A control apparatus for a hydraulically operated vehicular transmission, comprising:

an orifice;

a bypass path bypassing said orifice, said orifice and bypass path provided a in hydraulic oil supplying path to a hydraulic pressure coupling element provided in said hydraulically operated vehicular transmission, and a switching valve provided in said bypass path and shutting off said bypass path in association with the throttle of an engine at a low opening time when a throttle opening degree is equal to or lower than a first predetermined value and at a high opening time when said throttle opening degree is equal to or higher than a second predetermined value which is higher than said first predetermined value.

2. A control apparatus for a hydraulically operated vehicular transmission, comprising:

a first orifice;

a second orifice located in series with said first orifice;

a first bypass path for bypassing said first orifice;

a second bypass path for bypassing said second orifice, said first and second orifices and said first and second bypass paths provided in a hydraulic oil supplying path to a hydraulic pressure coupling element provided in said hydraulically operated vehicular transmission; and a first switching valve and a second switching valve communicating with and shutting off said first bypass path and said second bypass path in association with the throttle of an engine, respectively, wherein at a low opening time when a throttle opening degree is equal to or lower than a first predetermined value, only said first bypass path is shut off with said first switching valve, and at a high opening time when said throttle opening degree is equal to or higher than a second predetermined value which is higher than said first predetermined value, only said second bypass path is shut off with said second switching valve.

3. A control apparatus for a hydraulic operated vehicular transmission according to claim 2, wherein said first and second switching valves are formed in a common movable member movable in association with the throttle of the engine.

* * * * *